United States Patent [19]
Lark et al.

[11] 3,915,325
[45] Oct. 28, 1975

[54] ELECTRONIC CONTROL DEVICE

[75] Inventors: Wayne W. Lark, Clarendon Hills; Marvin D. Jennings, Naperville, both of Ill.

[73] Assignee: International Harvester Company, Chicago, Ill.

[22] Filed: Aug. 16, 1974

[21] Appl. No.: 498,009

Related U.S. Application Data

[63] Continuation of Ser. No. 305,193, Nov. 9, 1972, abandoned.

[52] U.S. Cl. .............................. 214/764; 318/674
[51] Int. Cl.² ............................................ E02F 3/36
[58] Field of Search ........... 214/762, 763, 764, 132, 214/1 CM; 318/674

[56] References Cited
UNITED STATES PATENTS

| | | |
|---|---|---|
| 3,662,243 | 5/1972 | Cavil et al............................ 318/674 |
| 3,697,849 | 10/1972 | Uchida................................ 318/674 |
| 3,726,428 | 4/1973 | Lark et al. ......................... 214/763 |

FOREIGN PATENTS OR APPLICATIONS

| | | |
|---|---|---|
| 847,656 | 9/1960 | United Kingdom................. 214/132 |

*Primary Examiner*—Robert J. Spar
*Assistant Examiner*—Ross Weaver
*Attorney, Agent, or Firm*—John P. O'Brien; Floyd B. Harman

[57] ABSTRACT

An electronically controlled return to dig assembly, which after initial indexing, automatically positions the tool on a tractor loader. The electronic assembly operates to compare current in different circuits, upon detection of current imbalance hydraulic means are employed to achieve a zero imbalance which corresponds to the initial indexing position.

4 Claims, 3 Drawing Figures

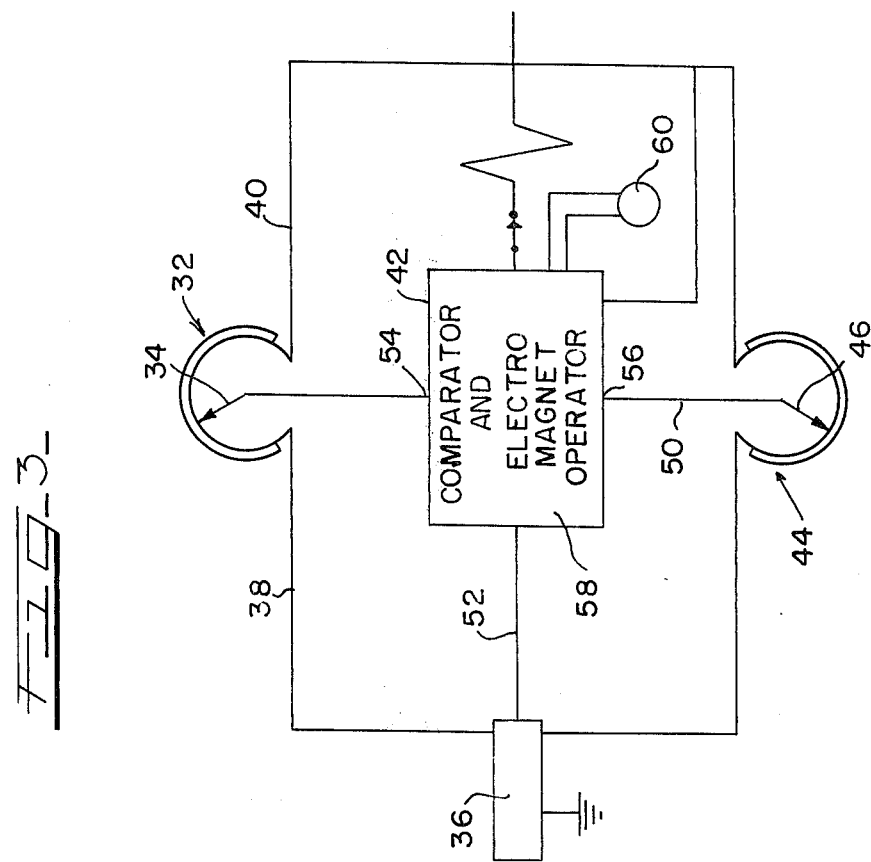
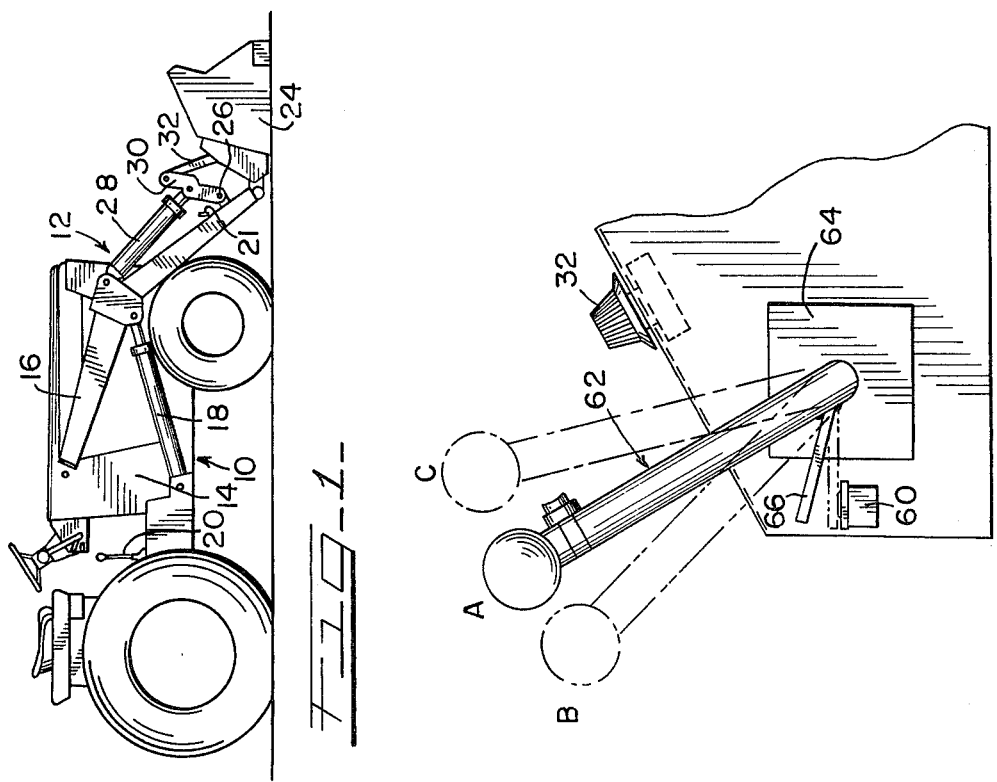

ELECTRONIC CONTROL DEVICE

This is a continuation of application Ser. No. 305,193, filed Nov. 9, 1972, now abandoned.

BACKGROUND OF THE INVENTION

This invention relates generally to tool or implement control mechanism wherein the tool is operatively carried from a vehicle and is movable through a certain range under control of the operator of the vehicle, and more particularly to a novel arrangement providing automatic indexing of the tool in some predetermined position intermediate the range of movement of the tool. In the present embodiment of the invention the novel automatic indexing arrangement is applied to a front-end type tractor loader.

The increasing complexity of present day material loading apparatus has provided the impetus for providing efficient control mechanisms for automatically indexing the bucket positioning arms of the loader, for example, at predetermined positions above or at ground level, i.e. in a dig position. Present day earth handling operations have greatly increased the number of tasks which an operator must perform and thus often distract from his overall efficiency. Also, the operator is not always able to visually observe the bucket to assure that it is in the correct operating position. Attempts have been made to at least partially remedy these problems by providing mechanisms which are capable of automatically controlling the movement of the bucket cylinders at predetermined positions. However, such solutions have generally provided relatively complex and inefficient apparatus whereby the desired positioning functions are not always achieved.

In accordance with the invention herein disclosed an electronically controlled assembly is provided for automatically positioning a loader bucket in one or more operating positions. The assembly includes an electronic control system and a hydraulic actuating system. The latter system is of conventional design and functions while the former comprises an electronic master-slave system which is arranged to actuate and de-actuate the hydraulic system. The electronic system employs master and slave potentiometers connected across an electric bridge, both sides of which are balanced when the bucket is in desired indexing position. However, any deviation of the bucket therefrom, creates current flow which actuates an electro-magnet. The field generated by the electro-magnet is sufficient to hold open the valve of the hydraulic system, until the bucket is returned to the indexing position. Upon return to the indexing position, the bridge system balances, current flow falls to zero de-actuating the electro-magnet, which in turn releases the spool controlling handle of the hydraulic valve.

It is therefore, an object to provide novel indexing means according to the preceding paragraphs in which the indexing means will operate to index the tool or bucket in one position within one range of movement of the tool or bucket while the tool or bucket is further being moved within another range of movement.

It is a further object to provide a novel indexing means for the bucket of a front-end type tractor loader which will automatically operate when the bucket is being pivoted from a dump position toward a digging position to stop the bucket in a predetermined digging position.

A further object is to provide a novel tool-indexing arrangement which can easily be applied to and incorporated in the hydraulic circuit means of existing types of vehicle-carried hydraulically-movable tools, to provide automatic indexing of the tool in a predetermined position.

Another object of this invention is to provide a control mechanism for loaders loades which automatically positions the bucket in one or more selected operational positions in response to preselected settings.

It is still another object of the present invention to provide a control means which is simple and easy to construct, and which is relatively inexpensive.

Various other objects and advantages will appear from the following description of one embodiment of the invention, and the novel features will be particularly pointed out hereinafter in connection with the following specification and drawings wherein:

FIG. 1 is a side elevational view of a tractor mounting a loader with the invention incorporated therein;

FIG. 2 is a side elevational view of the bucket controlling means as viewed from the side of the tractor; and FIG. 3 is a diagram of the electronic circuit employed.

DESCRIPTION OF THE PREFERRED EMBODIMENT

Referring now to the drawings wherein like reference characters designate like or corresponding parts throughout the several views, there is shown in FIG. 1 a material handling vehicle 10 of the front end loader type having the bucket in a dig position. It is understood that the invention has application in other vehicles such as loggers or similar equipment employing a plurality of actuators controlling different mechanisms. Vehicle 10 comprises a conventional loader assembly 12 mounted on a frame 14. The loader assembly 12 includes a pair of boom arms 16 (only one being shown) pivotally mounted on the frame 14 and is adapted to be adjusted vertically relative to the vehicle 10 by a pair of hydraulic boom cylinders 18. The boom cylinders 18 are controlled by the operator through the actuation of a lever means 20 mounted within easy reach of the operator. A bucket 24 is pivotally mounted to one end of each of the boom arms 16. Attached to each boom arm 16 is a stop 21 which acts to limit the amount of bucket roll back as will be described below. The bucket 24 is adapted for both vertical movement and rotary movement. Connected at the bucket is a bucket follower potentiometer 26. As the angular position of the bucket 24 changes, the setting of the potentiometer 26 is adapted to change proportionally. As will be explained below, the setting of this potentiometer 26 will always be indicative of the instantaneous angular position of the bucket 24.

Movement of the bucket 24 from its lowermost or dig position to its uppermost level or dump position, is controlled by a pair of bucket cylinders 28 operating in conjunction with the boom cylinders 18. The bucket cylinders 28 are each attached to a bucket amplifying link 30 which in turn is connected to a bucket link 32 and then to the bucket 24. The bucket cylinders 28 and the boom cylinders 18 may be selectively actuated by conventional hydraulic circuitry (FIGS. 3–5) whereby the position of bucket 24 may be oriented with respect to the boom 16.

Referring to FIG. 3, there is shown first or master potentiometer means 32 controlled by the operator by which the operator can set a desired bucket orientation with respect to the ground by manually adjusting the wiper 34 of this potentiometer on its resistor. The ends of this resistor are connected by means of leads 38 and 40 to a power supply 36 so that wiper position selects a control voltage. The power supply is powered by a battery whose negative terminal is grounded. This power supply is a conventional integrated power supply which is capable of supplying both the regulated direct current required for the control potentiometers, as well as the direct current for operating the remainder of the electronic circuitry.

A second or slave potentiometer 40 has its resistor similarly coupled to leads 38 and 40 so it is connected in parallel with the potentiometer 32. This reference potentiometer provides a vertical reference by mounting its resistor in a fixed position on the link and attaching its wiper 46 to support arm 16 in order that it may sense the links position with reference to true horizontal. Thus, any variation or movement of the link with respect to horizontal will cause the wiper to move relative to its resistor. A signal generated by the reference potentiometer will thus be related to the angle between the link and the horizontal reference plane.

The wiper of first potentiometer 32 is coupled by means of a lead 48 to one input of an amplifier 42, while the wiper 46 of second potentiometer 44 is coupled by means of lead 50 to its other input. The two potentiometers form a bridge circuit that is balanced when the bucket is at a "controlled" position with the two wipers having a positive potential with respect to ground. If either wiper changes position on its resistor the balance is destroyed and a potential difference will exist between the two wipers. The polarity of the potential difference will depend upon the direction in which the wipers have been displaced.

For example, if the wiper 34 is moved clockwise reducing the resistance between its contact point and the positive conductor, and increasing its resistance between its contact point and the negative conductor, the wiper 34 will become positive with respect to the wiper 46. Thereafter, if the wiper 46 is rotated in a clockwise direction (or its resistor is rotated in a counterclockwise direction) until the resistance between the contact point on the wiper 46 and the positive conductor equals the resistance between the wiper 34 and the positive conductor the circuit will be again balanced. In a similar manner, if the wiper 46 is rotated in a clockwise direction so as to reduce the resistance between its contact point and the positive conductor, the wiper 46 will become positive with respect to the wiper 34. Thus, the polarity of the voltages appearing on the conductors 48 and 50 can either be equal or one can have a greater positive value than the other, the other being considered a negative value.

From the above description it can be appreciated that the operator can set the desired bucket position with respect to a horizontal plane by moving the wiper of the master potentiometer. Any deviation of the bucket from the desired position will then be sensed by the reference potentiometer and the bucket will be moved to compensate for any changes, so the desired position will be maintained.

The amplifier 42 is coupled to the power supply 36 by means of lead 52. When the bridge circuit formed by the two potentiometers is balanced as described above, no potential difference will exist between the inputs 34 and 56 from the wipers, resulting in no amplification through the amplifier.

As stated upon imbalance, current will flow through the amplifier means 42. This current is then directed into an electro-magnet operator means 58 which in turn actuates an electro-magnet means 60. That is the electro-magnet 60 develops a magnetic field capable of attacting and holding objects produced of certain metals such as iron.

Referring now to FIG. 2 wherein is shown the bucket position control means 62 which via valve bank means 64 controls the flow of high pressure fluid to cylinder means 28. The various positions of handle means 62 include position A or neutral, position B shown in phantom wherein the bucket rolls fack, and position C, also in phantom, the bucket dump position. In each position the spool (not shown) in valve bank means is moved to cause the proper hydraulic fluid flow. As is apparent handle mans 62 is provided with a conventional spring deadman's device (not shown) to continuously urge it in the neutral position.

The latching means 66 constructed of the proper metal is secured to the handle means 62 such that as the handle 62 is moved into the rollback position B the latching means 66 moves into the proximity of the electro-magnet means 60. As is apparent the handle means 62 could function as a latching means or the particular structure and relationship can be varied. The initial feature is that as the bucket control handle is moved into a rollback position it is brought into the proximity of an activated electro-magnet which is capable of immobilizing it, in that position. As stated as soon as handle 62 is moved from neutral position A the bridge becomes unbalanced, current flows and the electro-magnet 60 is actuated.

In operation the operator moves handle means 62 into return to dig position and by rotating wiper 34 of master potentiometer 32 balances the system. Any deviation from this bucket position will result in current flow. Thus, assume the operator moves handle 62 into position C while dumping the load, in order to return the bucket 24 to the desired return to dig position he need only move handle 62 into position B until electro-magnet 60 secures it. The valve 62 is held open and fluid is pumped to the cylinder 28, at the point which the bucket 24 is in the return to dig position current flow falls to zero, and the handle 62 springs into the neutral position A shutting off the valve. During this time the operator need devote no attention to the action.

Thus it is apparent that there has been provided, in accordance with the invention, a return to dig means that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An implement control mechanism for use with the actuation lever of a hydraulically power implement, said actuation lever having a neutral position and an implement operating position with pressure means for constantly urging said lever to said neutral position, the improvement of said implement control mechanism comprising a master potentiometer, a slave potentiometer and voltage source electrically connected together in parallel, the wiper arm of said slave potentiometer operatively connected to the movement of said implement, voltage comparator means electrically connected between the wiper arms of said potentiometers for providing an electrical signal in response to a voltage difference between said wiper arms, and electrically responsive holding means energized by said electrical signal for providing a holding force to restrain said actuation lever in said implement operating position until a zero voltage difference condition occurs between said wiper arms, said holding force being greater than and opposite to the constant force exerted by said pressure means and terminating upon the occurrence of said zero voltage difference to cause said actuation lever to return to said neutral position.

2. The implement control mechanism of claim 1, wherein said electrically responsive holding means comprises an electromagnet and wherein said actuation lever includes a latching arm portion of magnetic permeable material that is disposed within the magnetic field of force of said electromagnet when said actuation lever is placed in said implement operating position, the magnetic attraction of said magnetic field on said latching arm portion being greater than and opposite to the constant force exerted by said pressure means and being terminated upon the occurrence of said zero voltage difference to cause said actuation lever to return to said neutral position.

3. An implement control mechanism for a tractor having a pair of boom arms, a bucket pivotally supported between said boom arms on an axis transverse to the longitudinal axis of said tractor, a hydraulic cylinder for effecting rotation of said bucket about said transverse axis, a hydraulic circuit including valve means for regulating the flow of hydraulic fluid to said hydraulic cylinder, lever means operable between neutral and roll position connected to said valve means in such a manner to cause said bucket to rotate when said lever means is in said roll position, and return spring means for constantly urging said lever means towards said neutral position, the improvement of said implement control mechanism comprising a master potentiometer, a slave potentiometer and an electrical voltage source electrically connected together in parallel, voltage comparator means electrically connected between the wiper arms of said potentiometers for providing an electrical signal in response to a voltage difference between said wiper arms, said slave potentiometer being operatively connected between said bucket and said boom arms in such a manner that a change in the angular orientation of said bucket causes a proportional displacement of said slave potentiometer wiper arm, and electromagnet means energized by said electrical signal for providing a holding force greater than and opposite to the force exerted by said return spring means to hold said lever means in said roll position until the bucket rotates to a pre-set angular orientation whereupon there occurs a zero voltage difference between said wiper arms to deenergize said electromagnet means and thereby permit the force of said return spring means to return said lever means toward said neutral position.

4. The implement control mechanism of claim 3, wherein said lever means includes a latching arm portion of magnetic permeable material that is disposed within the magnetic field of force of said electromagnet means when said lever means is placed in said roll position the magnetic attraction of said magnetic field on said latching arm portion being greater than and opposite to the constant force exerted by said pressure means and being terminated upon the occurrence of said zero voltage difference to cause said actuation lever to return to said neutral position.

* * * * *